US012778337B2

(12) United States Patent
Freire Falcão Teles Caramelo et al.

(10) Patent No.: US 12,778,337 B2
(45) Date of Patent: Nov. 3, 2026

(54) BEVERAGE PREPARATION SYSTEMS AND PROCESSES, INCLUDING PORTION HOLDER WITH ENHANCED RETENTION AND OPERATION

(71) Applicant: WEADD, LDA., Marinha Grande (PT)

(72) Inventors: Daniel Freire Falcão Teles Caramelo, Lisbon (PT); Agostinho Miguel Quitério Garcia Carvalho, Leiria (PT); Sonia Raquel Da Silva Gomes Josue, Caldas Da Rainha (PT)

(73) Assignee: WeADD, Lda., Marinha Grande (PT)

( * ) Notice: Subject to any disclaimer, the term of this patent is extended or adjusted under 35 U.S.C. 154(b) by 820 days.

(21) Appl. No.: 18/008,260

(22) PCT Filed: Dec. 17, 2020

(86) PCT No.: PCT/PT2020/050055
§ 371 (c)(1),
(2) Date: Dec. 5, 2022

(87) PCT Pub. No.: WO2021/246887
PCT Pub. Date: Dec. 9, 2021

(65) Prior Publication Data
US 2023/0210299 A1 Jul. 6, 2023

(30) Foreign Application Priority Data
Jun. 4, 2020 (PT) ........................................ 116469

(51) Int. Cl.
*A47J 31/06* (2006.01)

(52) U.S. Cl.
CPC ................................ *A47J 31/0689* (2013.01)

(58) Field of Classification Search
CPC .......................... A47J 31/0689; A47J 31/0642
See application file for complete search history.

(56) References Cited

U.S. PATENT DOCUMENTS 5,910,205 A 6/1999 Patel
8,561,524 B2 10/2013 Demiglio et al.
(Continued)

FOREIGN PATENT DOCUMENTS

CN 203302876 U 11/2013
DE 20218335 U 2/2003
(Continued)

OTHER PUBLICATIONS

International Search Report, PCT/PT2020/050055 Mailed Jan. 3, 2021.
(Continued)

*Primary Examiner* — Thuyhang N Nguyen
(74) *Attorney, Agent, or Firm* — Calderone McKay LLC

(57) ABSTRACT

The present invention refers to systems and process associated with beverage preparation based upon the extraction of a single portion (1) of a pre-measured quantity of precursor substance in a brewing apparatus (4), whereby said single portion (1) presents a compostable confinement (2) and can be collected inside of a portion holder (3) that is adapted so that can be retained inside a cavity of said brewing apparatus (4). In particular, the present invention relates addresses the problem of ensuring effective and reliable retention of the portion holder (3) on the brewing apparatus (4).

13 Claims, 14 Drawing Sheets

(56) References Cited

U.S. PATENT DOCUMENTS

| | | | | |
|---|---|---|---|---|
| 8,707,855 | B2 | 4/2014 | Demiglio et al. | |
| 10,130,206 | B2 | 11/2018 | Rijskamp et al. | |
| 10,154,751 | B2 | 12/2018 | DeMiglio et al. | |
| 2005/0034605 | A1 | 2/2005 | Webster | |
| 2007/0186779 | A1 | 8/2007 | Fung | |
| 2009/0229470 | A1 * | 9/2009 | Dorfmueller | A47J 31/0689 426/77 |
| 2011/0274802 | A1 * | 11/2011 | Rivera | B65D 85/8061 426/431 |
| 2012/0121768 | A1 * | 5/2012 | Lai | A47J 31/3623 426/231 |
| 2012/0285334 | A1 | 11/2012 | DeMiglio et al. | |
| 2013/0055904 | A1 | 3/2013 | Demiglio | |
| 2013/0340626 | A1 * | 12/2013 | Oh | A23F 3/18 426/115 |
| 2015/0274412 | A1 * | 10/2015 | Bisio | B65D 85/8046 426/115 |
| 2019/0069710 | A1 * | 3/2019 | DeMiglio | A47J 31/0689 |
| 2023/0276974 | A1 | 9/2023 | Caramelo et al. | |
| 2023/0284816 | A1 | 9/2023 | Caramelo et al. | |

FOREIGN PATENT DOCUMENTS

| | | | |
|---|---|---|---|
| DE | 202007002064 | U1 | 6/2007 |
| DE | 202009009125 | U1 | 10/2010 |
| DE | 102010048513 | A1 | 4/2012 |
| DE | 202016106830 | U1 | 12/2016 |
| EP | 2907425 | A1 | 8/2015 |
| EP | 3089634 | A2 | 11/2016 |
| ES | 2627337 | A1 | 1/2015 |
| KR | 10-1326682 | B1 | 11/2013 |
| WO | 2002082963 | A1 | 10/2002 |
| WO | 2012/001115 | A1 | 1/2012 |
| WO | 2012142949 | A1 | 10/2012 |
| WO | 2014063998 | A1 | 5/2014 |
| WO | 2015132203 | A1 | 9/2015 |
| WO | 2016075630 | A1 | 5/2016 |

OTHER PUBLICATIONS

International Search Report and Written Opinion of PCT/PT2020/050057, Feb. 11, 2020.

International Search Report and Written Opinion of PCT/PT2020/050056, Feb. 2021.

* cited by examiner

BEVERAGE PREPARATION SYSTEMS AND PROCESSES, INCLUDING PORTION HOLDER WITH ENHANCED RETENTION AND OPERATION

FIELD OF THE INVENTION

The present invention refers to the field of beverage preparation systems and processes based upon extraction of a portion of beverage precursor substance provided in a single portion to an extraction device of a beverage preparation apparatus.

PRIOR ART

The prior art includes brewing devices presenting a collection space adapted for receiving a portion of beverage precursor substance, whereby said collection space is connected to a lid part by means of a swivelling connection such that the lid part can be operated in open and closed positions.

The WO 97/43939 discloses a brewing device of this type, comprising a dose-holder with a handle and defining a percolating chamber suited for holding a pre-packaged coffee dose, and a lid associated to the dose-holder in order to open and close upon the latter and thus define a second part of the percolating chamber, whereby the lid is hinged onto the dose-holder. The document discloses that there are provided means that can be manually operated to open and close the lid such as to allow the operator to open the lid with the same hand that holds the handle of the dose-holder. In particular, the lid can be actuated by a rod-button operating a leverage associated with elastic means. The elastic means can be in the form of a return spring suited recalling and keeping the lid in a closed position.

The U.S. Pat. No. 5,910,205 provides a further example of such a brewing device. In this case, the brewing device comprises a brew basket that can hold ground coffee and is hinged connected to a lid above of the ground coffee that has a plurality of spaced holed provided there through to distribute water generally uniformly over said bed of ground coffee. The hinged connection of the basket with the lid member seems to be provided by a rod-like portion of the lid being swivelling retained in mutually opposing holes on a peripheral support of the basket next to the opening thereof. The brew basket includes a base and a sidewall having a plurality of fins extending generally radially on the base and further extending along the sidewall.

The WO 2014/063998 A1 discloses a brewing apparatus that is adapted so that it can be operatively attached to an external part of a beverage preparation machine. Said brewing apparatus presents a container part that is connected in a swivelling connection to a lid part.

The WO 2015/132203 A1 further discloses a brewing apparatus that presents a container part connected to a lid part by means of a swivelling connection provided at a peripheral portion thereof.

The type of swivelling connection can determine ergonomics and reliability, as it can be affected by intensive use, and be constrained by construction complexity and costs.

Moreover, the widespread market penetration of single use portion capsules mostly produced in metallic and plastic materials is increasingly constrained by environmental issues.

This problem has been addressed by several approaches known in prior art.

One approach is to provide a capsule adapted so that it can be reused.

The DE 20 2009 009125 U1 discloses a capsule with a container part hinged connected to a lid part.

The U.S. Pat. No. 8,707,855 B2, the U.S. Pat. No. 8,561,524 B2 and the U.S. Pat. No. 10,154,751 B2 also disclose a capsule-like beverage brewing device that presents a body defining a brew chamber configured to contain a dry beverage medium, and a lid that is removably securable to the body, in particular in a hinged-like connection provided by a sideways supported swivelling rod.

Another one of the approaches is the use of re-usable capsule holders providing users with the option of refilling a capsule with a quantity of, for example, ground and roasted coffee.

Document WO 02/082963 A1 discloses a re-usable beverage filter cartridge of the type of the present invention, whereby a cartridge is configured so that it can be collected inside of a brewing device and so that can collect a single portion of a beverage portion.

Document EP 24019445 A1 discloses a device of the type of the present invention, for adapting a food capsule into a capsule holder. Said device comprises a holding portion for holding at least a portion of said capsule, and sealing means for circumferentially adapting to the capsule holder and/or to the fluid injection element, and/or to the capsule outside surface, in a leak-tight manner. The holding portion is hinged connected to a lid portion that further comprises sealing means, for example a circular O-ring rubber seal, to ensure that the contact surface between said holding portion and lid is leak-tight. Moreover, the internal shape of the holding portion can be adapted to enclose a soft pod having substantially flexible walls with a generally discoid shape.

The EP 3089634 B1 also discloses a brewing device of the type of the present invention, whereby a portion holder comprises a container part hinged connected to a lid part and adapted so that can operate with different types of single portions. The lid part comprises a first sealing member and a second sealing member which is different from the first sealing member and configured to seal a second brewing chamber between the lid part and a second holder when the second holder is inserted into a hollow of a brewing unit configured for receiving different types of portable pad and/or capsule holders.

The EP 2907425 B1 discloses a brewing system of the type of the present invention whereby a container part is hinged connected to a lid part, and discloses several types of flow distribution upstream of the edible portion.

The prior art thus includes solutions for adapting brewing devices of beverage preparation machines to operate with individual portions of beverage precursor substance in different types of capsules or pods, but there is a need for further optimizing said adapting devices.

DESCRIPTION OF THE INVENTION

The present invention discloses a beverage preparation system that includes a beverage preparation device, such as an extraction device, that can be operated with single portions of beverage precursor substance, such as roasted coffee, tea, and similar, and an adapter device that is configured as a portion holder that can operate inside a portion receiving part of said extraction device and be operated with single portions presenting a compostable material confinement, thereby minimizing the environmental impact associated with envelope materials confining said precursor substance.

A first objective is to provide a system including a portion holder of the aforementioned type and a respective single portion using compostable confinement material and providing enhanced flow distribution characteristics.

This objective is solved according to claim 1, whereby preferred embodiments are disclosed in dependent claims.

An associated objective of the present invention is to provide a system including a single portion and a portion holder adapted so that it can be used in an extraction device that comprises a portion receiving part that can be engaged with a flow feeding part, whereby the single portion is adapted to maximize the amount of carried edible substance thereby best occupying the free volume available inside of the portion holder.

This objective is solved according to the present invention by means of a single portion that presents volumetric shape and dimension that are similar to the volumetric shape and dimension of the collection space provided by container and lid parts, whereby a bigger volume fraction of single portion extends downstream and a smaller volume fraction extends upstream of the interface region between container and lid parts, and such that the exterior surface thereof is in the vicinity or in contact with the interior surface provided by said container and lid parts, optionally also with a flow-dispensing part provided on the base wall.

This feature advantageously provides a maximum use of the volume available inside the portion holder, notably for the edible substance containing single portion.

An associated objective is to provide a portion holder of the aforementioned type such that the lid part presents a flow-conducting wall upstream of the single portion that provides better flow distribution of the pressurized flow provided by an injection element of the flow feeding part of extraction device upstream of a single portion inside of the portion holder.

In particular, this objective is solved according to the present invention by means of a portion holder whereby the flow-conducting wall presents a downstream-oriented concave shape presenting a plurality of flow passageways and peripherally surrounded by an annular flow-confining wall.

The flow-conducting wall of the lid portion can present a plurality of flow passageways, arranged on the concave portion of the lid such that there are provided flow passageways aligned with the prevailing flow direction and at different relative heights in respect of the interior space confined by the portion holder.

This advantageously optimizes the flow distribution pattern inside of the portion holder and upstream of the single portion.

An associated objective is to provide a portion holder of the aforementioned type whereby the hinged connection between container and lid portions presents a simple construction, with lower production costs, and operates in reliable manner, preventing being stuck jammed inside the extraction device, and enabling an ergonomic use thereof by a user.

This objective is solved according to the present invention by means of a portion holder whereby the lid part is peripherally hinged connected to the container part by lid connection means that include a material connection of the container part with the lid part.

It is advantageous when the lid connection means are configured such that can be provided by bi-material injection moulding of the container and lid parts such that these can be produced as a single piece.

This advantageously simplifies the hinged connection of the lid and container parts, providing a long lasting reliable and simple connection.

Moreover, the lid connection means can be provided in a band-like element made from an elastically deformable material. In particular, the lid connection means can be made as a same injection moulding part as at least one of retention means and liquid sealing means associated with the container part of portion holder, in particular extending around a downstream sidewall portion thereof and around an upstream-oriented inward protruding step portion in the top region thereof, and configured for retention and liquid sealing of the container part of portion holder inside the portion receiving part of extraction device.

This advantageously optimizes the use of two different materials, or materials with different properties, in the portion holder.

An associated objective is to provide a portion holder of the aforementioned type such that there is provided an effective liquid sealing of the interface region between container and lid parts thereof, thereby preventing any leakage of pressurized flow out of the portion holder.

This objective is solved according to the present invention by means of a portion holder whereby the container part presents a container sealing portion configured as an inward-extending peripheral step of the container part providing an upstream-oriented and inward-protruding support surface for a rim region of single portion and also a support surface for the downstream-oriented peripheral free-edge of the lid part, in particular configured as a lid sealing portion, such that there is provided a sealing engagement of said container and lid sealing portions in case the portion holder is in the closed position.

In particular, the container part can present a container sealing portion configured as an inward-extending peripheral step of the container part providing an upstream-oriented and inward-protruding support surface in an elastically deformable material, whereby said container sealing portion is provided upstream of the downstream sidewall portion and inwards of the upstream sidewall portion.

This advantageously provides for effective and reliable liquid sealing of the interface region between container and lid parts of the portion holder.

It is advantageous when the lid sealing means are configured such that can be provided by bi-material injection moulding of the container and lid parts such that these can be produced as a single piece.

Moreover, the container sealing part can be provided in the same elastically deformable material, and as a material continuation of at least one of retention means and lid connection means associated with the container part of the portion holder, in particular extending around a sidewall and upstream-oriented inward protruding step portion thereof and configured for sealing the interface region of the container and lid parts of portion holder.

This advantageously optimizes the use of two different materials, or materials with different properties, in the portion holder.

An associated objective is to provide a portion holder of the aforementioned type such that can be inserted and reliably retained inside a receiving portion of said extraction device.

In particular, said objective is solved according to the invention by means of a portion holder comprising a container and lid portions whereby the container portion presents retention means arranged on the sidewall of container portion with different configuration and material properties as the remaining sidewall, said retention means being adapted so that it can be elastically pressed inwards at a predefined retention position inside a portion receiving part of the extraction device.

The retention means can be provided such that retain the container portion at a position inside the portion receiving part of the extraction device where the lid portion can be operated between a closed position whereby the lid portion sits upon the container portion and does not project above, and an open position swivelled outwards at least 45 degrees from the closed position.

The retention means can be provided on an outwards-oriented indent of the sidewall and be provided on a different material as the remaining sidewall.

The retention means can be configured so that extend outwards and be provided only on a downstream portion of the sidewall, preferentially next to the base wall of the container part.

The retention means can be provided by means of bi-material injection moulding of the container and lid parts such that these can be produced as a single piece.

Moreover, the retention means can be provided in the same elastically deformable material, and as a continuation of at least one of lid connection means and container sealing means associated with the container part of the portion holder, in particular extending to a top region of the sidewall of the container part and around an upstream-oriented inward protruding step portion in the top region thereof, and configured for hinged connection to the lid part and liquid sealing of the container part of portion holder inside the portion receiving part of extraction device.

This advantageously optimizes the use of two different materials, or materials with different properties, in the portion holder.

LIST OF FIGURES

The present invention shall be hereinafter described in greater detailed with support of a description of preferred embodiments of main components and respective drawings.

The Figures show:

FIG. 1: side-cut view diagram of a system and first step of a process according to the present invention;

FIG. 2: side-cut view diagram of a system and second and third steps of a process according to the present invention, including provision of a portion holder (3) and dropping a single portion (1) inside thereof;

FIG. 3: side-cut view diagram of a system and fourth step of a process according to the present invention, including introducing the portion receiving part (41) containing the portion holder (3) into the flow provision part (42) of a brewing device (4);

FIG. 4: side-cut view diagram of a system and third step of a process according to the present invention, including provision of a portion holder (3);

FIG. 5: side view of an embodiment of an open portion holder (3) in a system according to the invention;

FIG. 6: perspective top view of open portion holder (3);

FIG. 7: top view of open portion holder (3);

FIG. 8: detail view of the lid connection means (6) between container (31) and lid (32) portions of the portion holder (3);

FIG. 9: perspective side-cut view of open portion holder (3);

FIG. 10: side-cut views of successive moments of introduction of a portion holder (3) in a extraction device (4) of an apparatus (5) in a system according to the invention;

FIG. 11: perspective side-cut view of portion holder (3) at an almost closed position;

FIG. 12: detail side-cut view of the lid connection means (6) of container (31) and lid portions (32);

FIG. 13: perspective side-cut view of portion holder (3) at a closed position;

FIG. 14: side-cut view of closed portion holder (3);

FIG. 15: perspective top view of closed portion holder (3);

FIG. 16: side view of first embodiment of portion holder (3);

FIG. 17: side view of second embodiment of portion holder (3);

FIG. 18: side view of third embodiment of portion holder (3);

FIG. 19: top view of closed portion holder (3);

FIG. 20: perspective top view of a portion holder (3) in a non-closed position and containing a single portion (1);

FIG. 21: side-cut view of a portion holder (3) in a non-closed position and containing a single portion (1);

FIG. 22: side-cut view of a portion holder (3) in a closed position and containing a single portion (1);

FIG. 23: side-cut view of a portion holder (3) in a non-closed position and containing a single portion (1), inside of a portion receiving part (41) of extraction device;

FIG. 24: side-cut view of a portion holder (3) in a closed position and containing a single portion (1), inside of a portion receiving part (41) of extraction device;

FIG. 25: top view of a second embodiment of a portion holder (3) in an open position;

FIG. 26: bottom view a second embodiment of a portion holder (3) in an open position;

FIG. 27: perspective side-cut view of the second embodiment of portion holder (3) and second embodiment of single portion (1);

FIG. 28: side-cut view of the second embodiment of portion holder (3) and second embodiment of single portion (1).

DETAILED DESCRIPTION OF PREFERRED EMBODIMENTS OF THE INVENTION

The present invention shall be described based upon the general example of a beverage preparation system adapted for operating with single portions (1), such as capsules or pods, in preparing espresso-like coffee, soluble coffee and similar aromatic beverages.

The single portions (1) present a confinement (2) adapted for confining a pre-measured quantity of a beverage precursor substance, such as roast and ground coffee, whereby this confinement (2) is preferentially provided in a compostable material, such as a cellulosic-based material, or similar, and does not include other non-compostable materials, thereby advantageously eliminating environmental waste disposal impacts.

Besides of said single portions (1), such system includes an apparatus (5) with an extraction device (4) adapted so that can collect said single portion (1), when at an open position, and enable exposure thereof to an upstream pressurized fluid flow, usually at a fluid pressure above 2 bar, preferentially above 8 bar, and at a fluid temperature above 80° C., preferentially above 88° C., when in a closed and operating position, as known in prior art.

Moreover, the general example relates to systems whereby the beverage preparation apparatus (5) includes an extraction device (4) having a portion receiving part (41) provided as stand-alone part, for example configured in a general porta-filter design, presenting a cavity adapted so that can receive a single portion (1) and can be manually inserted for example in a generally draw-like arrangement, into a respective preferentially form fitted flow provision part (42), thereby reaching an operative position thereof.

As represented in FIG. 1, an embodiment of the system can include a first type of single portion (1') and a beverage preparation apparatus (5) comprising an extraction device (4) having a portion receiving part (41) and a flow provision part (42) that provides pressurized flow upstream of the single portion (1'), for example a plastic capsule, and collection and/or discharge of resulting beverage downstream thereof.

The beverage preparation apparatus (5) can further comprise a flow pressurizing device, such as a hydraulic pump, and a flow heating device, such as a thermoblock. Other aspects of such beverage preparation apparatus (5) are known in prior art such that one herewith abdicated of further details thereof.

In a first step of a process according to the invention, there is provided a portion holder (3) comprising a container (31) hinged connected to a lid portion (32), and adapted so that can receive a single portion (1) different from said first single portion (1') when said lid portion (32) is at an open position, and confine it in liquid sealing manner in case at a closed position.

A process according to the present invention is further represented in successive steps in FIGS. 2 to 4.

In a second step, whereby a portion receiving part (41) is outside with the beverage preparation apparatus (5), unengaged with the flow provision part (42), a portion holder (3) is inserted into the portion receiving part (41), such that a lid (32) can be operated between open and closed positions. According to an advantageous aspect, the portion holder (3) is inserted in a pressurized fitting manner at least along the lateral portion thereof, such that it is retained inside the portion receiving part (41) by retention means (7) provided on the container portion (31) and does not fall out of it even in case the latter is eventually oriented downwards.

In a third step, a second type of single portion (1) is inserted into the container portion (31) of the portion holder, preferentially by means of manually dropping it inside thereof.

In a fourth step, the portion receiving part (41) is manually inserted into the flow provision part (42), for example in a drawer-like arrangement, such that the receiving part (41) reaches a closed position, and the injection of upstream pressurized flow can be started. In particular, the hinged connection of the lid portion (32) is adapted so that is downwards-pushed by the flow provision part (42) as it gets driven inside thereof and retained in sealed engagement with the container portion (31) whilst inside the flow provision part (42).

The process can further include removing the portion receiving part (41) out of engagement in the flow provision part (42), whereby the hinged connection of the lid portion (32) is adapted so that only raises partially whilst being removed from the downwards-pushing engagement by the flow provision part (42).

The process can further include turning the portion receiving part (41) downwards such that the single portion (1) falls driven by the gravity force out of the container portion (31), but the portion holder (3) further remains retained inside the portion receiving part (41). This feature advantageously enhances the convenience of use of the portion holder (3).

FIGS. 5 to 8 represent a preferred embodiment of a portion holder (3) according to the present invention, comprising a container portion (31) with a rotationally symmetric sidewall (311) and base wall (312) defining a cavity space, and a lid portion (32) peripherally hinged to the container portion (31) by means of lid connection means (6) so that it can be operated into a closed position whereby the single portion (1) can be confined inside the cavity space.

The container part (31) is adapted so that it can be retained inside a portion receiving part (41) of an extraction device (4) that can be manually held and operated in a draw-like manner into an operating position engaged with a flow provision part (42) of said extraction device (4) that can present the general features described in association with previous figures.

As depicted, the portion holder (3) comprises a container part (31) with a sidewall (311) and a base wall (312), and a lid part (32) with a flow-conducting wall (321) extending transversally to the prevailing flow direction and presenting flow passageways (33) and a collar-like flow-confining wall (322) extending laterally peripherally of the flow-conducting wall (321), and jointly confining a collection space extending upstream and downstream of the peripheral interface region between container and lid parts (31, 32).

As referred above, there are portion holders of this type known in the prior art, presenting a hinged connection of the container and lid parts. Given the repetitive and numerous actuation of said hinged connection, this type of connection can be prone to mechanical wear and tear issues, for example in the case of using spring-driven connections, or to ergonomic constrains, such as in the case of lever-like digital actuation supports.

According to a notorious feature of the portion holder (3) according to the present invention, the lid part (32) is peripherally hinged connected to the container part (31) by lid connection means (6) that include a material connection (61) of the container part (31) with the lid part (32), whereby said lid connection means (6) are configured such that can be provided by injection moulding of the container and lid parts (31, 32) such that these can be produced as a single piece.

This advantageously simplifies the hinged connection of the lid and container parts (31, 32), providing a long lasting reliable and simple connection.

It is further advantageous when the lid connection means (6) include a material connection (61) provided in the form of an elastically bendable element, preferentially in a band shape or similar, that extends continuously from the upstream region of the upstream sidewall (311) of container part (31) to the lid part (32), whereby the material connection (61) preferentially includes an elastic material band that is provided such that exerts an elastic force on the lid part (32) upwards in respect of the container part (31), such that the lid part (32) tends towards the open position.

As can be best seen in FIGS. 6 and 8, the lid connection means (6) can include a connection retention arrangement (62) adapted so that can assist the retention of the lid part (32) at the closed position on the container part (31).

The connection retention arrangement (62) preferentially includes a male-female arrangement (621, 622) in opposing edges of, and arranged sideways in respect of, the material connection (61) and adapted so as to provide a first hard-point retention of the lid part (31) on the container part (31).

The male-female arrangement (621, 622) is preferentially provided on respective peripheral support non-curved portions of the container and lid parts (31, 32) and corresponding to a portion of, and to a projection on, the upstream free-edge region, respectively.

The lid connection means (6) and the holder retention means (7) are provided in a material with similar elastic properties, preferentially in a same material provided that extends continuously from the retention means (7) to the lid connection means (6), The lid connection means (6) and the holder retention means (7) can be provided in a unique part, or piece, together with the container and lid parts (31, 32) by means of bi-material injection moulding.

The portion holder (3) can further include flow dispensing means (36), preferentially provided as a disk-like single piece, adapted so that it can be retained on, preferentially by means of nut-groove peripheral engagement with, the base wall (312) of the container part (31), whereby said flow dispensing means (36) present projections (361) extending upstream from a base portion and configured with a non-puncturing and non-perforating shape, for example with a spherical-like shape with a circular cross-section profile, and further present at least one, preferentially a plurality of, flow passageways (362) configured as holes on the base portion of the flow dispensing means (36).

FIGS. 9 to 14 show several cut views of the embodiment of portion holder (3) in a system according to the present invention.

The Applicant has tested several embodiments of a portion holder of the type of the present invention, and determined that the retention thereof inside of the portion receiving part (41) of extraction device (4), should be very advantageous in terms of general ergonomic use thereof.

According to a notorious feature, the portion holder (3) according to the present invention presents retention means (7) presenting a different configuration and different material properties from the configuration and material properties of the sidewall (311) of the container part (31), and adapted so that said container portion (31) can be retained in pressurized fitting inside said portion receiving part (41).

In particular, the retention means (7) can be provided in a different material or in a different material composition as the rest of said container part (31).

Moreover, the retention means (7) are provided in an elastically deformable material, for example a rubber-like synthetic material, whereas the container part (31) can be provided in a substantially rigid material.

This feature advantageously provides for a more effective retention of the container part (31), because the retention means (7) thus provide for an enhanced pressurized fitting of the portion holder (3) inside the cavity of the portion receiving part (41) of the extraction device (4).

It is preferred when the container part (31) supports retention means (7) provided in a tubular shape around at least part, preferentially at least most part, more preferentially all of the sidewall (311) such that can be pressed under peripheral strain inside said portion receiving part (41).

Moreover, the retention means (7) can present at least one, preferentially several projections extending outward in respect of at least most of the remaining sidewall (311) of container part (31), preferentially all of the remaining sidewall (311) that sits inside of the portion receiving part (41).

Moreover, at least one of, preferentially both, the retention means (7) and the container part (31) of portion holder (3) are provided in a different material or in a different material composition as the portion receiving part (41).

The retention means (7) can present a non-smooth, preferentially grooved, exterior surface presenting at least one of: a rugosity and a pattern, with projections extending outwards in at least one of: a transversal and parallel direction in respect of the prevailing flow direction, configured so as to generate a material pressure with the corresponding interior surface of said portion receiving part (41) transversal to said prevailing flow direction, whereby the retention means (7) are preferentially provided in a material at least partially elastically deformable.

The retention means (7) can be provided as a plurality of outwards extending projections arranged successively, for example in rows, at least from the vicinity of the peripheral interface region between container and lid parts (31, 32) to the base wall (312).

In particular, the retention means (7) can be provided as outwards extending projections presenting a cross-section profile narrowing from the base towards the free-edge thereof.

As further represented in these drawings, the portion holder (3) comprises a container part (31) with a sidewall (311) that presents an upstream sidewall portion (3111) and a downstream sidewall portion (3112) that is recessed inwards relative to the upstream sidewall portion (3111), and preferentially also relative to an outward extending portion of the base wall (312), and the retention means (7) are provided on a laterally-oriented indent associated with said downstream sidewall portion (3112), such that the retention means (7) extend inwards and outwards in respect of the upstream sidewall portion (3111).

According to another notorious feature of the portion holder (3), the retention means (7) are provided as an injection moulded part that extends through a perimeter transition region between upstream and downstream sidewall portions (3111, 3112) thereby forming at least one of:

- a container sealing portion (34) extending inwards along the interior perimeter and that provides sitting support, in the peripheral interface region between the container and lid parts (31, 32), for a rim portion of the single portion (1) and to a lid sealing portion (35), and
- a material connection (61) of lid connection means (6) that provide the hinged connection of the lid part (32) with the container part (31) at a peripheral region thereof.

This feature advantageously provides for a multiple use and benefit of use, of an elastically deformable material in the portion holder (3), not only in as retention means (7) thereof, but also as at least part of the liquid sealing means and hinged connection means.

As should also be known to the expert in the field, this type of systems, including both extraction devices and single portions, configured for being impinged by pressurized flows, can present liquid sealing issues.

According to another notorious feature of the portion holder (3) according to the present invention, the container part (31) presents a container sealing portion (34) for providing liquid sealing of the portion holder (3) in the closed position, said container sealing portion (34) configured as an inward-extending peripheral step providing an upstream-oriented support surface for a rim region of single portion (1) and also a support surface for the downstream-oriented peripheral free-edge of the lid part (32), in particular configured as a lid sealing portion (35), such that there is provided a sealing engagement of said container and lid sealing portions (34, 35) in case the portion holder (3) is in the closed position.

This feature advantageously provides for effective and reliable liquid sealing of the interface region between container and lid parts (31, 32) of the portion holder (3).

In particular, the container part (31) can present a container sealing portion (34) configured as an inward-extending peripheral step provided in an elastically deformable material, whereby said container sealing portion (34) is provided upstream of the downstream sidewall portion (3112) and inwards of the upstream sidewall portion (3111).

The container sealing portion (34) and the holder retention means (7) can be provided in a material with similar elastic properties, preferentially in a same material or a material with similar composition, that extends continuously from the retention means (7) to the container sealing portion (34), whereby the lid connection means (6) and the holder retention means (7) are provided in a single part or piece as the container and lid parts (31, 32) by means of bi-material injection moulding.

This again provides for the benefits of using an elastically deformable material together with a different material, in particular a rigid material, in the portion holder (3).

The lid part (32) can present a lid sealing portion (35) provided on the downstream-oriented peripheral free-edge of the lid part (32), whereby said lid sealing portion (35) presents a downstream-oriented peripheral nut, for example in a V-like cross-section shape, or similar, and whereby said lid sealing portion (35) is configured to sit under pressure on the container sealing portion (34) thereby providing a sealing engagement of said container and lid sealing portion (34, 35) in case the portion holder (3) is closed.

The container part (31) can support a container sealing portion (34) provided in an elastically deformable material, preferentially a material different from the container part (31), and The lid part (32) can present a lid sealing portion (35) provided in the same material as the remaining lid part (32), preferentially in a non-elastic rigid material.

The portion holder (3) can comprise container and lid parts (31, 32) with respective container and lid sealing portions (34, 35) that are provided in mutually opposing regions, in particular in a downstream-oriented base region and in a upstream-oriented inwards extending step, respectively, and adapted such that the lid sealing portion (35) sits under closure-driving pressure on the container sealing portion (34) along a continuous peripheral extension in the closed position of the portion holder (3), whereby said closure-driving pressure can be provided by at least one of:

- pressurized engagement of the top region of the lid part (32) with the flow provision part (42) of extraction device (4);
- pressurized engagement of lid retention means (324) corresponding to a closed position of the portion holder (3).

The expert in the field is familiar with the relevance of upstream flow distribution in respect of the upstream-oriented surface of the edible substance inside a single portion (1), in particular if the flow-feeding part (42) of the extraction device (4) presents a single inlet of pressurized flow.

According to another notorious feature, the portion holder (3) comprises a lid part (32) that presents a flow-conducting wall (321) in a generally downstream-oriented convex shape, for example in a frusto-conic shape, configured such that the cavity space confined by the portion holder (3) extends to the vicinity of the upstream feed-edge thereof while providing an upstream-oriented free space extending peripherally in respect of the flow-conducting wall (321) at a distance downstream of the upstream free-edge of the lid part (32). In particular, said flow-conducting wall (321) presents a plurality of flow passageways (33), for example arranged in a matrix-like pattern, extending in a direction similar to the prevailing flow direction and provided on different portions of the downstream-oriented convex shape of the flow-conduction wall (321), at different levels downstream relative to the upstream free-edge of the lid part (32).

This feature advantageously provides for a better flow distribution upstream of the single portion (1) and therefore, enhanced extraction efficiency of the edible substance, such as for example roasted ground coffee or soluble coffee, or similar beverage precursor substances.

Moreover, the portion holder (3) can comprise a lid part (32) that presents a collar-like flow-confining wall (322) extending laterally peripherally of a flow-conducting wall (321) and extending upstream from a lid sit region (323) common to the flow-conducting wall (321), whereby the exterior perimeter of the flow-conducting wall (321) corresponds to at least 80%, preferentially at least 85% of the interior perimeter of the flow-confining wall (322).

The flow-confining wall (322) can extend upstream configuring an upstream free-edge of the lid part (32) such that, in case the portion holder (3) is closed, the upstream free edge of the flow-confining wall (322) can extend at a level that is similar to, preferentially higher by a tolerance than, the peripheral edge of the container part (31).

According to another notorious feature, the portion holder (3) can comprise a lid part (32) that presents a collar-like flow-confining wall (322) laterally extending along the periphery region of a flow-conducting wall (321), said lid part (32) including or supporting at least one of, preferentially all of:

- lid connection means (6; 61, 62) arranged at a first peripheral region thereof and providing swivelling connection with the container part (31);
- lid retention means (324) arranged on a second peripheral region thereof, preferentially opposite to the first peripheral region;
- lid sealing portion (35) extending along a downstream-oriented peripheral edge common to the flow-conducting wall (321).

This arrangement advantageously provides a simple overall construction of the portion holder (3).

The Applicant has tested several possible portion holders in different extraction devices (4), and thereby learned that there is a risk to the user resulting from an unconstrained removal of the portion holder from the extraction device (4), after termination of the pressurized flow injection associated with the beverage extraction, whereby uncontrolled hydraulic pressure-driven opening of the portion holder and unintended spills of hot water may occur.

In this regard, according to another notorious feature of the present invention, the portion holder (3) comprises container and lid parts (31, 32) presenting lid retention means (314, 324) configured so as to provide a user actionable mechanical retention of the lid part (32) on the container part (31), whereby said lid retention means (314, 324) are not arranged next to the hinged connection of the lid and container parts (31, 32).

This feature advantageously provides for reliably securing the lid part (32) to the container part (31), by means of simple user-actionable mechanical arrangement, in particular of a hard-point type, or similar. Moreover, said lid retention means (314, 324) provide an effective actuation of the container and lid sealing means (34, 35).

Moreover, the portion holder (3) comprises container and lid parts (31, 32) presenting lid retention means (314, 324) configured so as to provide mechanical retention of the lid part (32) on the container part (31) by means of the user applying pressure on a peripheral portion of the top region of the lid part (32), enough to drive a lid retention portion (324) past a container retention portion (314).

Moreover, the portion holder (3) comprises container and lid parts (31, 32) presenting lid retention means (314, 324)

configured so as to provide mechanical retention of the lid part (32) on the container part (31) even in case the portion holder (3) is not engaged by the flow provision part (42) of the brewing device, preferentially also requiring the user to apply pressure so as to release the retention of the lid part (32) from the container part (31).

Moreover, the portion holder (3) comprises container and lid parts (31, 32) presenting lid retention means (314, 324) configured so as resist the upwards-acting hydraulic pressure build-up inside the confined space of the portion holder (3) associated with flow injection, whereby the lid retention means (314, 324) are preferentially configured such that can provide retention and release thereof by means of a similar gesture and pressure by the user, and preferentially providing haptic perception thereof to the user.

Moreover, the portion holder (3) presents lid retention means (314, 324) arranged opposite to connection means (6), in particular to connection retention means (621, 622) associated with the connection means (6) of the lid part (32) to the container part (31), such that there are provided mutually opposing mechanical retentions of the lid part (32) of portion holder (3), whereby said retentions are preferentially configured so that they can be jointly actuated.

Moreover, the portion holder (3) presents lid retention means (314, 324) configured as a localized embossment of the internal surface of the container part (31) operationally aligned with a flattened exterior portion of the flow-confining wall (322) of the lid part (32), such that the lid part (32) can be retained in a closed position whereby a lid sealing portion (35 is pressed downwards against container sealing portion (34).

FIGS. 15 to 18 show several preferred embodiments of retention means (7) in a portion holder (3) according to the present invention.

In a preferred embodiment the retention means (7) can present a plurality of projections configured as ribs extending outwards and circumferentially around the sidewall of container part (31). Alternatively, the rib-like projections can extend along meridional alignments arranged successively around the external engaging surface of the container part (31) next to the base wall (312) thereof. The wall thickness of each retention rib can be smaller than the interstitial space in-between neighbouring ribs. It is advantageous when the projections do not extend outwards further than the broadest vertical projection of the container part (31).

In a different embodiment the retention means (7) can be configured as spherical or frusto-conical projections arranged in successive rows along the outside surface so as to be engaged by pressurized fitting when the portion holder (3) is inserted into the portion receiving part (41) of the extraction device (4).

FIG. 19 show a top view of a preferred embodiment of the lid part (32) presenting a plurality of flow passageways (33), and respective relation to the lid connection means (6).

As also referred above and depicted in previous drawings, the flow passageways (33) are provided on different concentric regions of the flow conducting part (321) of the lid part (32), each of said concentric regions extending at different inclinations relative to the prevailing flow direction, such that the upstream flow can be conducted downstream at different relative levels.

It is advantageous when the flow passageways (33) are provided in a regular matrix-like arrangement over the flow conducting part (321), including in a central region that extends substantially transversally to the prevailing flow direction and in a peripheral region that extends at a reduced angle relative to the prevailing flow direction, for example of less than 30°, preferentially less than 20°.

Figure 1:
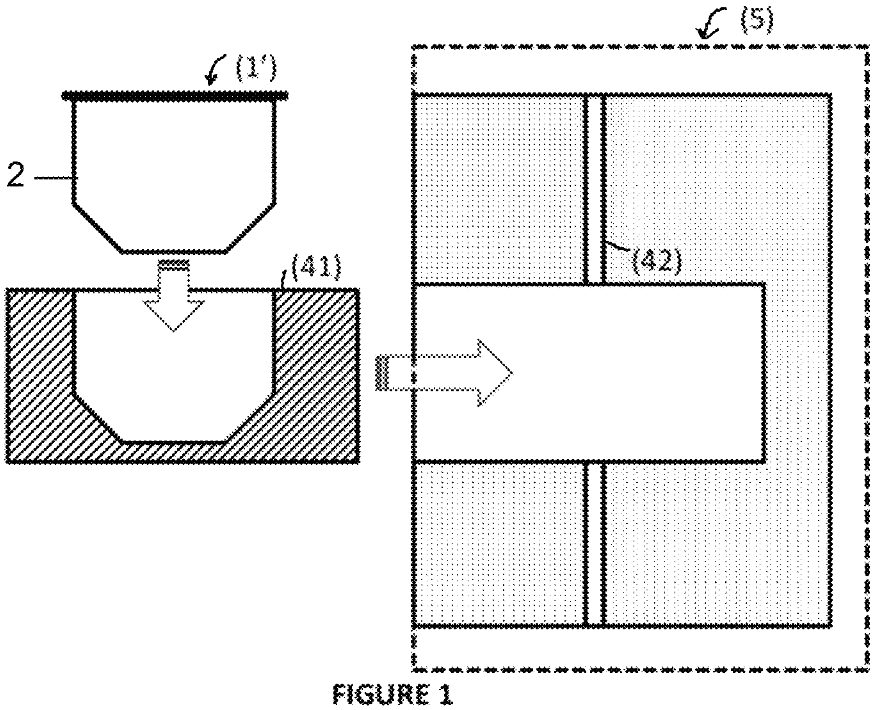
Figure 2:
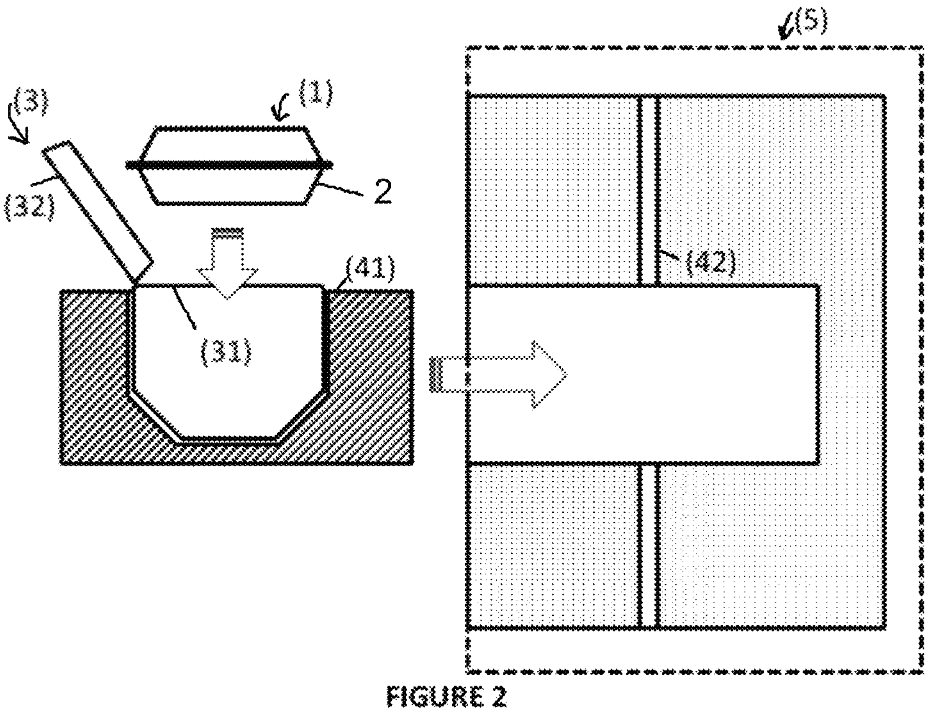
Figure 3:
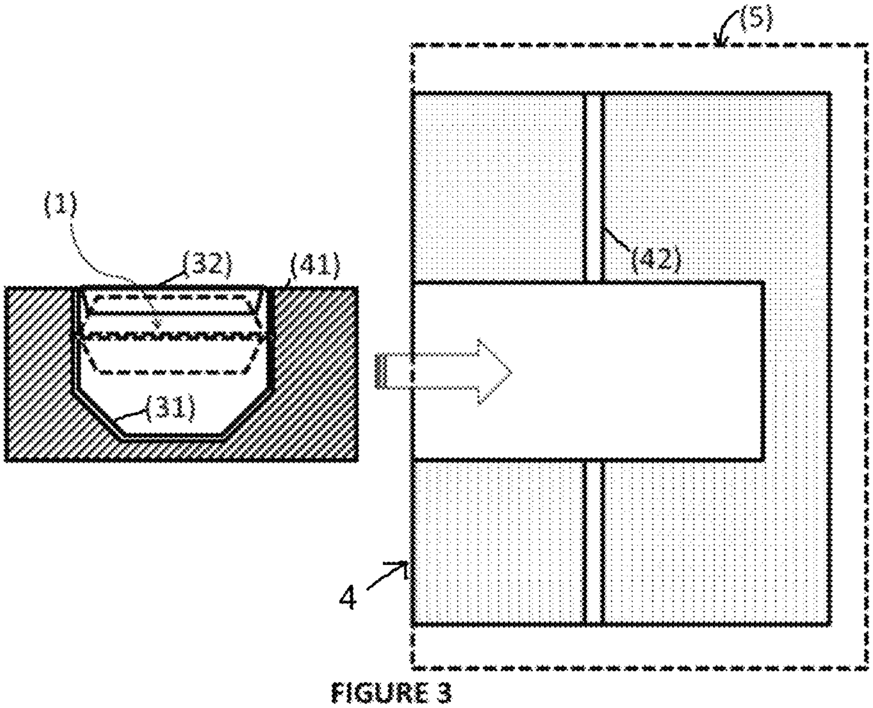
Figure 4:
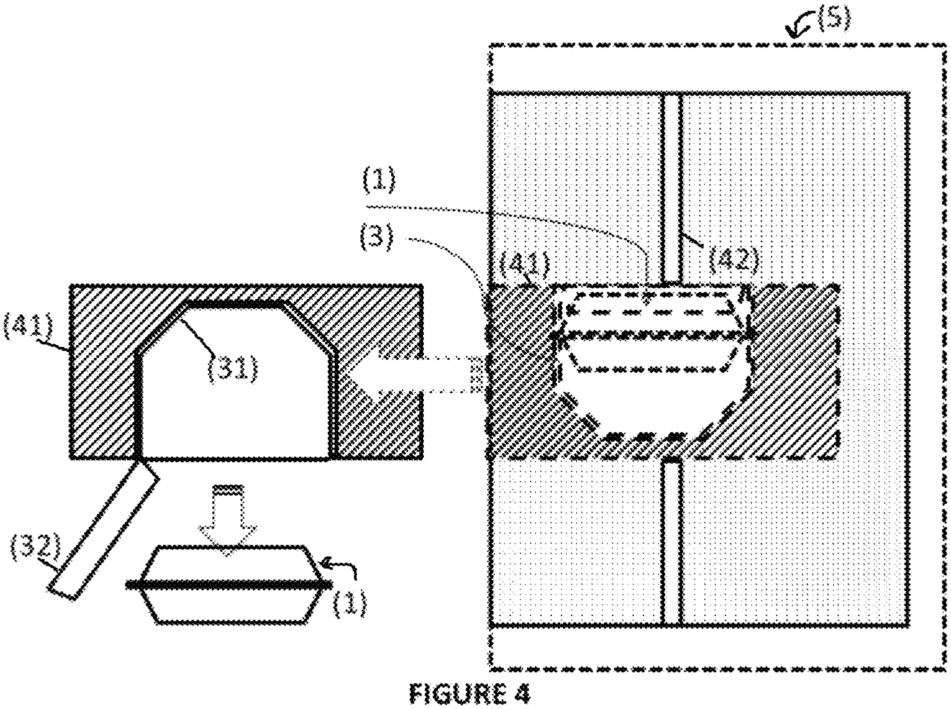
Figure 5:
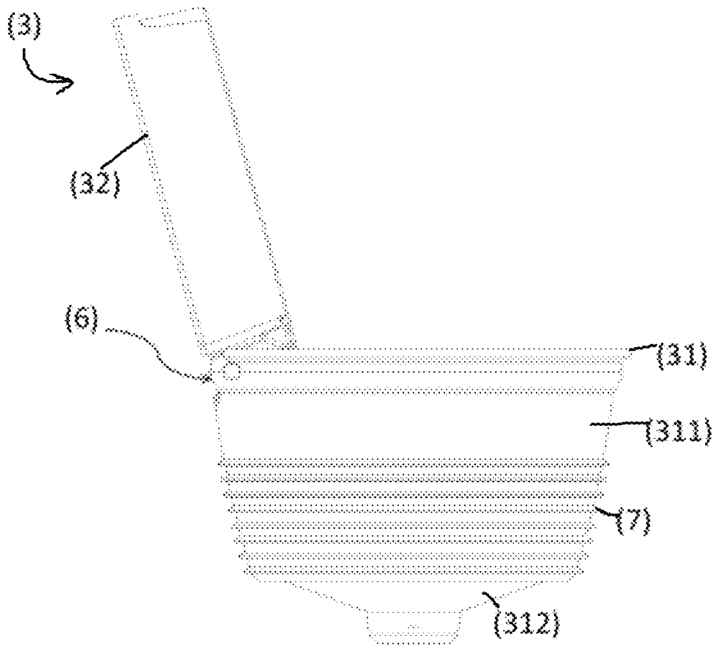
Figure 6:
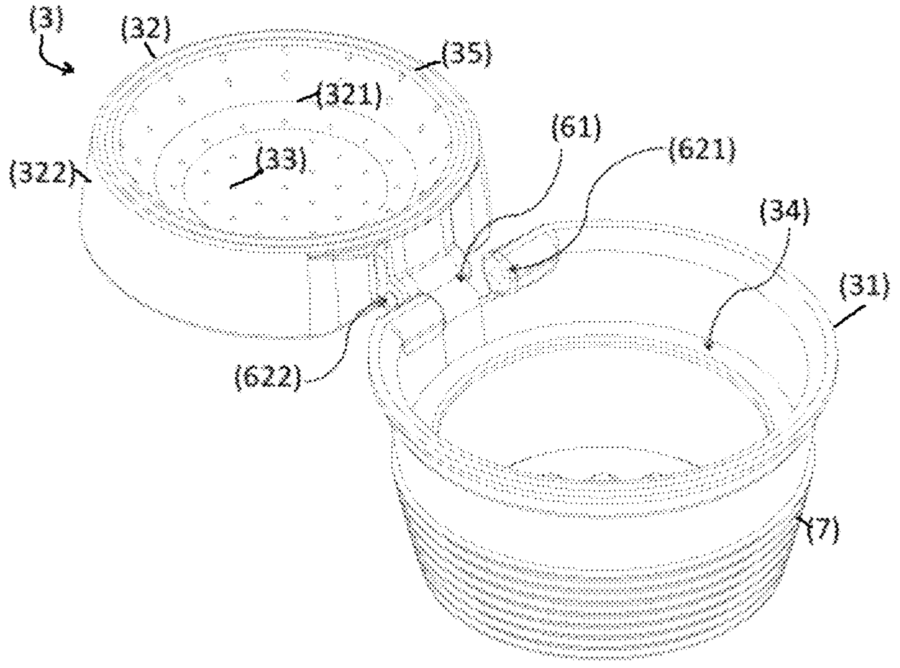
Figure 7:
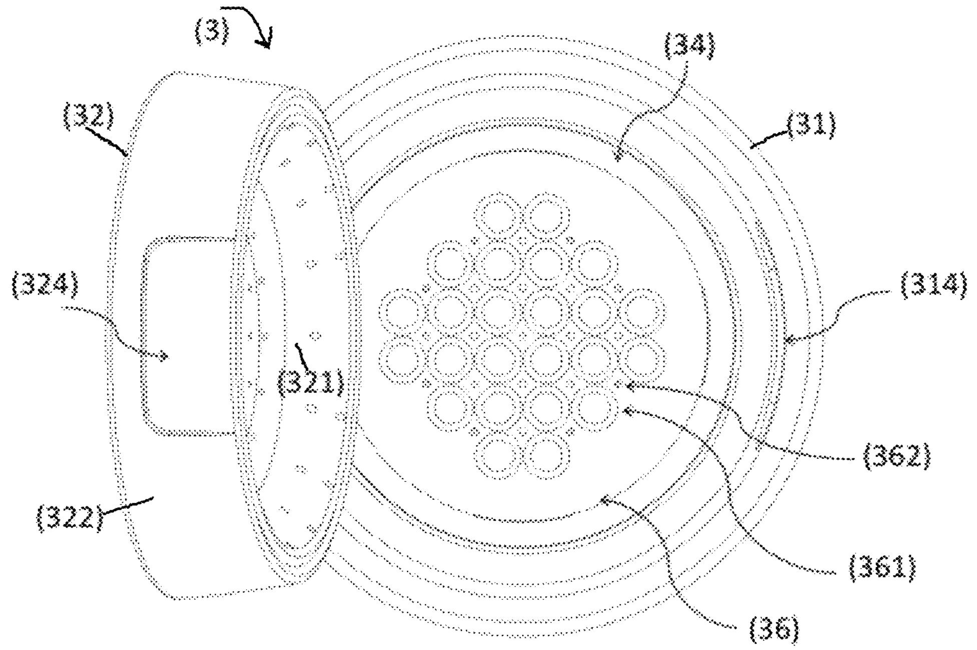
Figure 8:
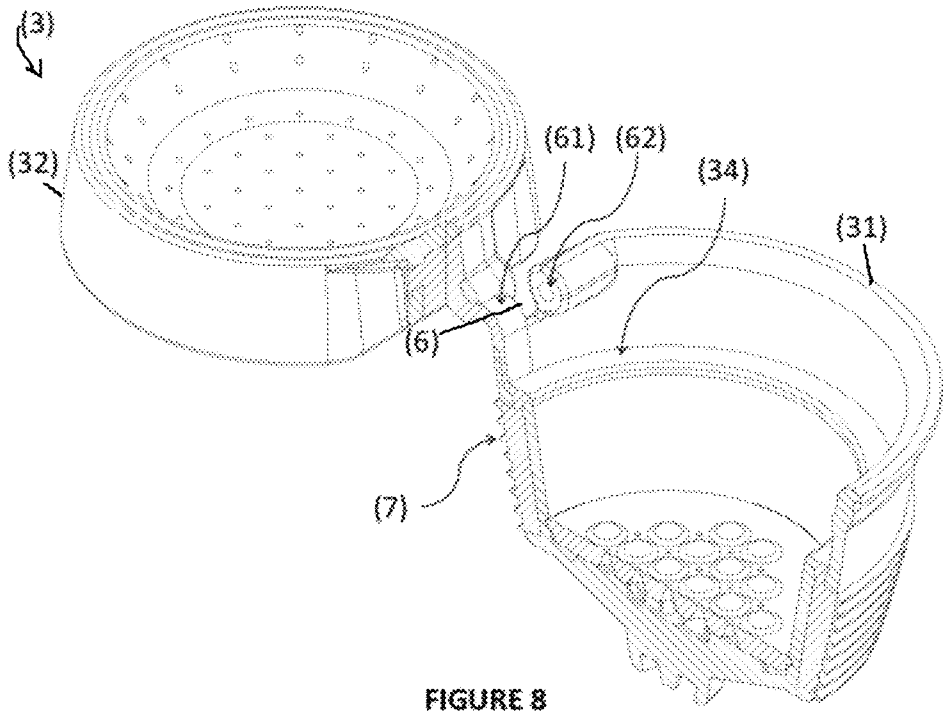
Figure 9:
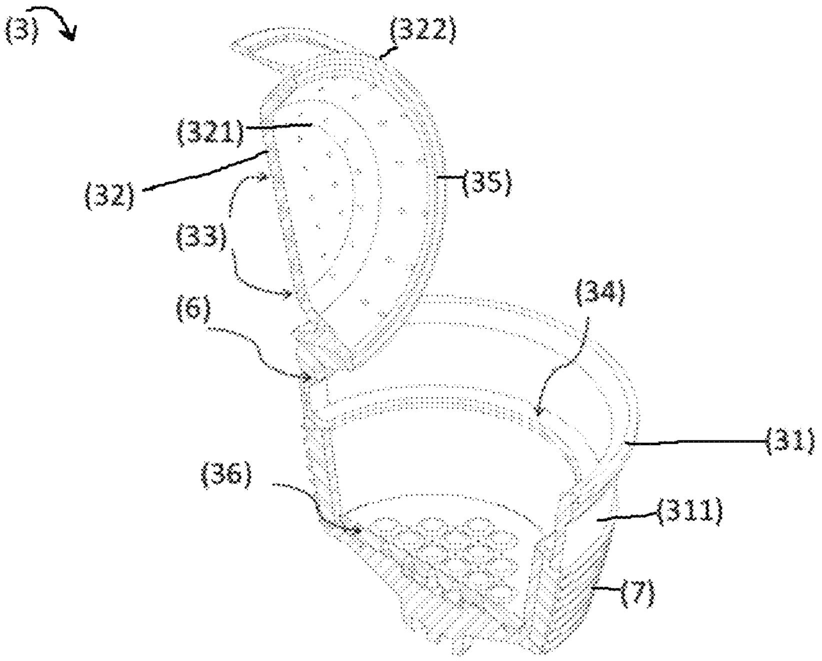
Figure 10:
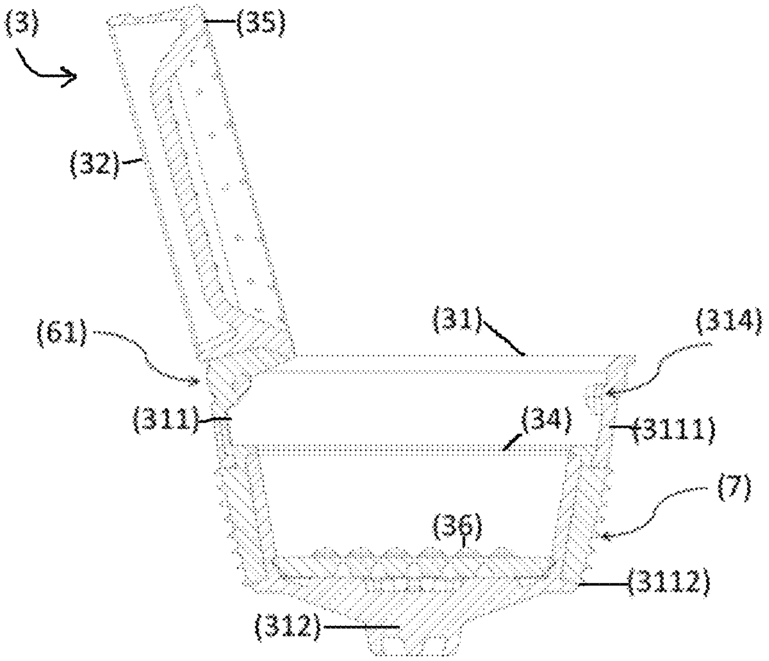
Figure 11:
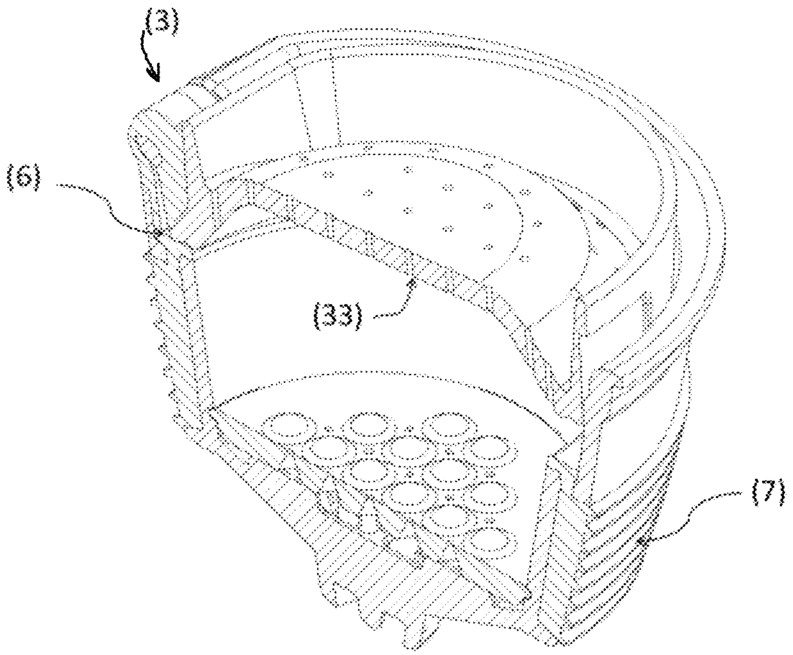
Figure 12:
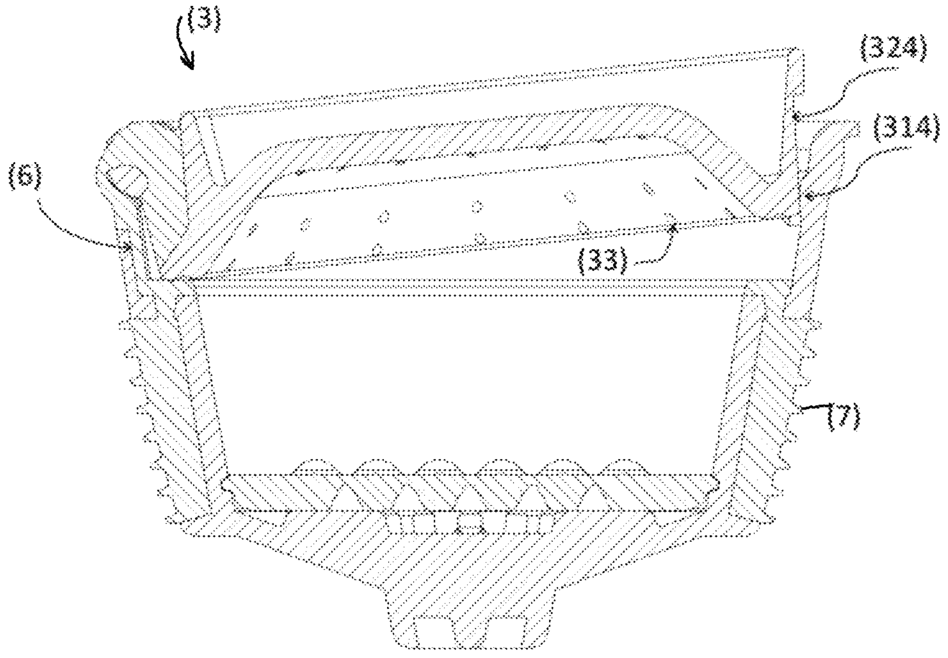
Figure 13:
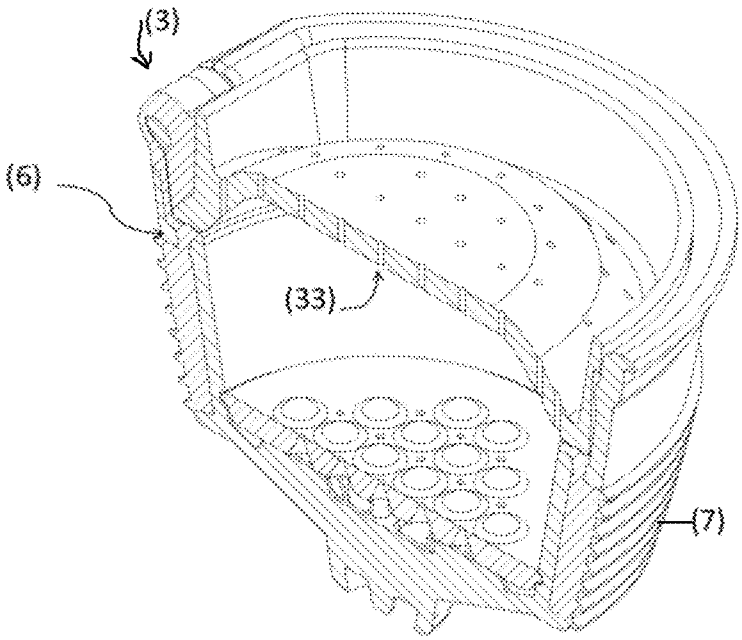
Figure 14:
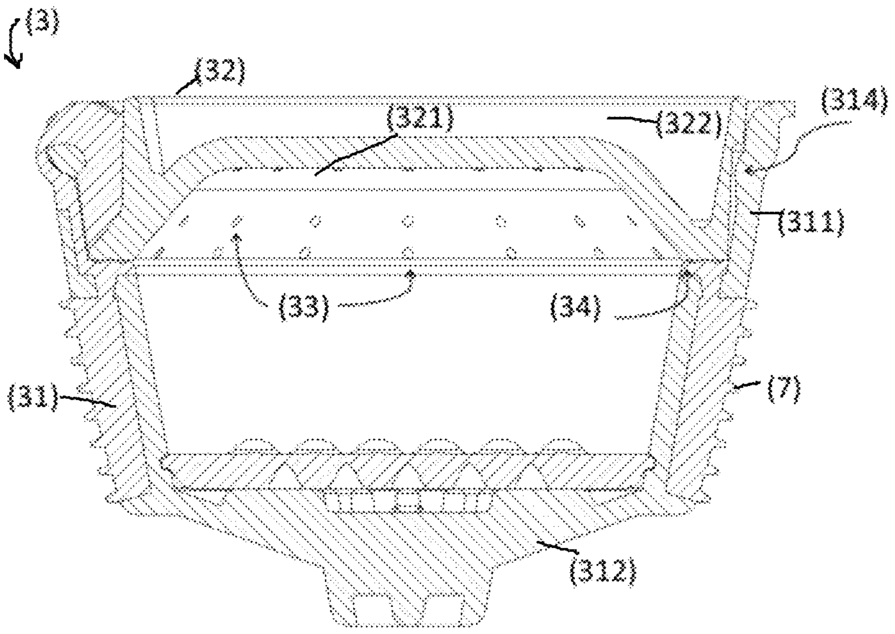
Figure 15:
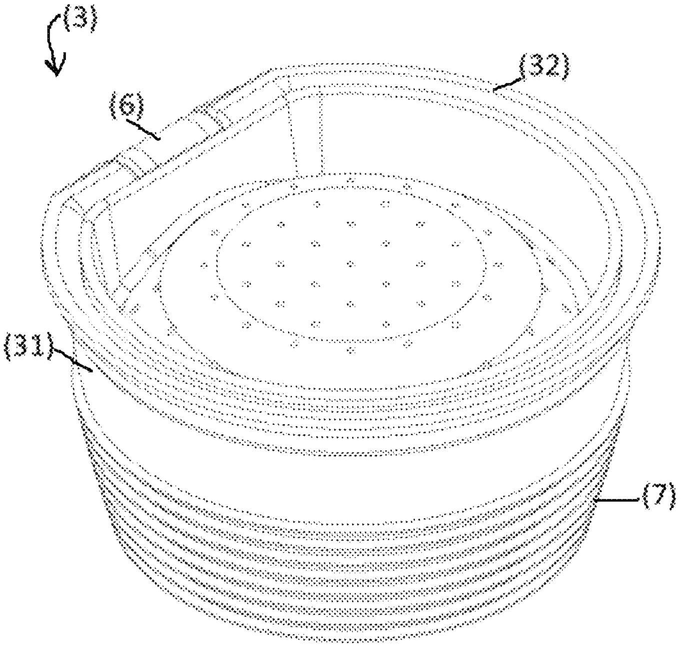
Figure 16:
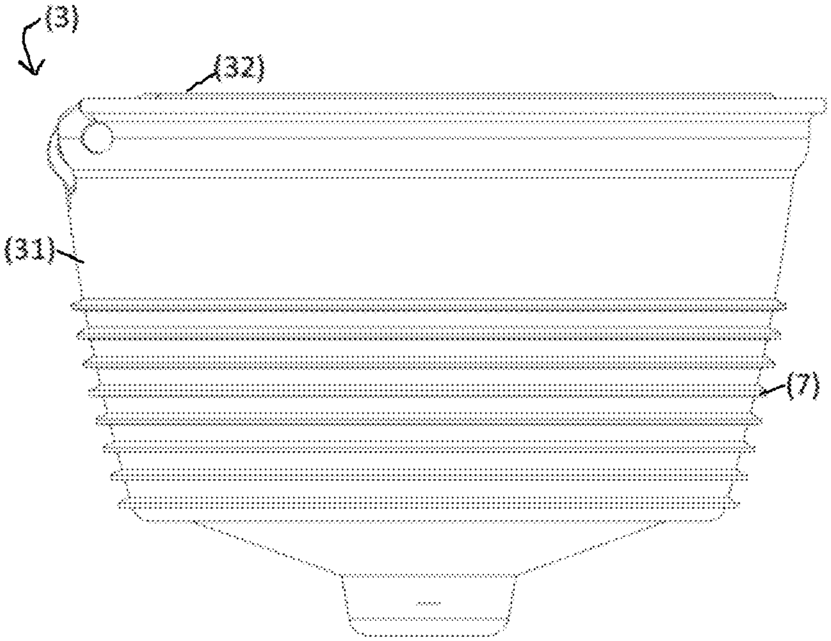
Figure 17:
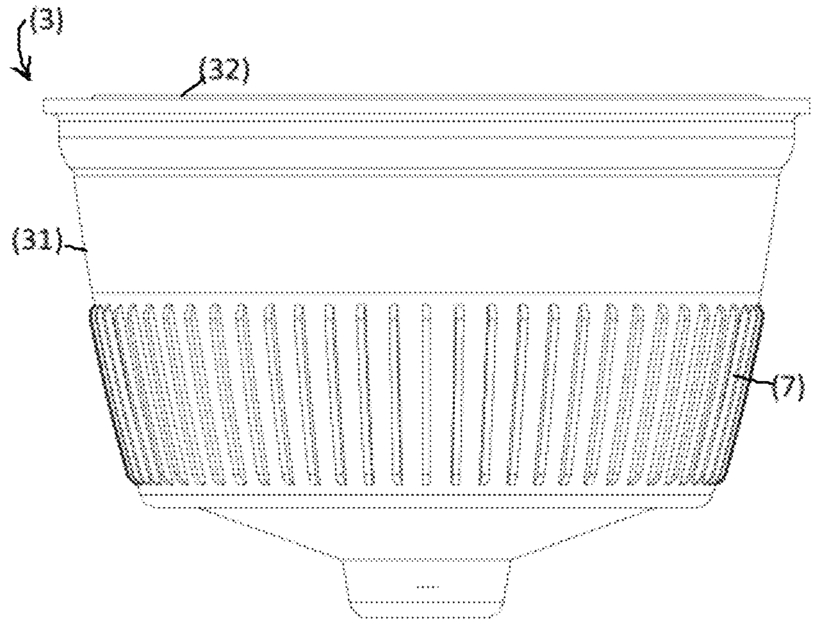
Figure 18:
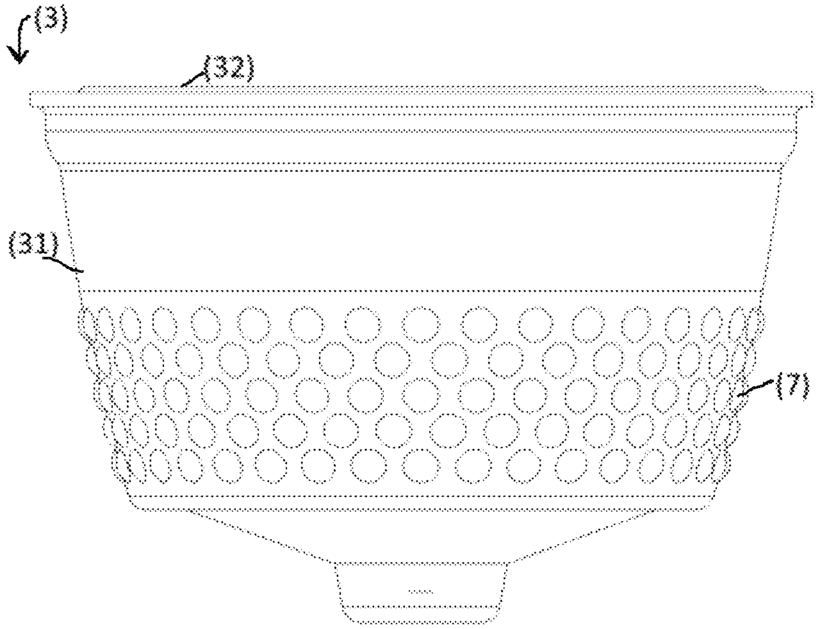
Figure 19:
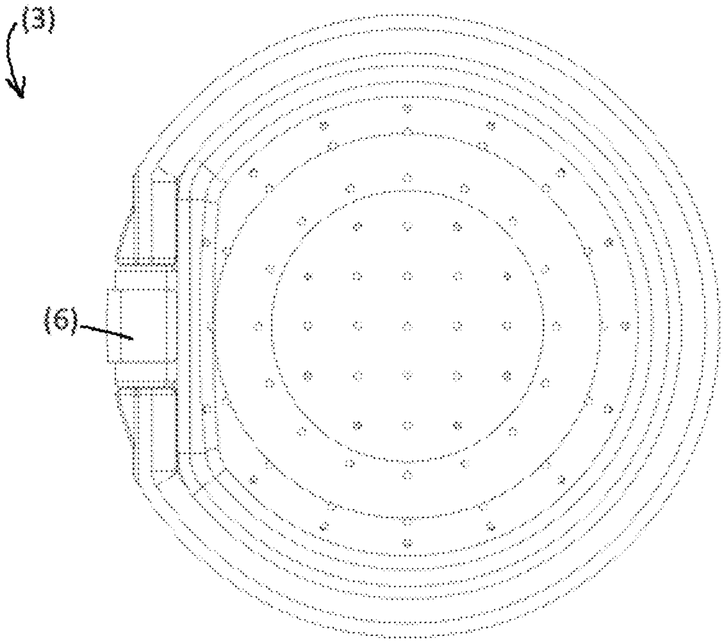
Figure 20:
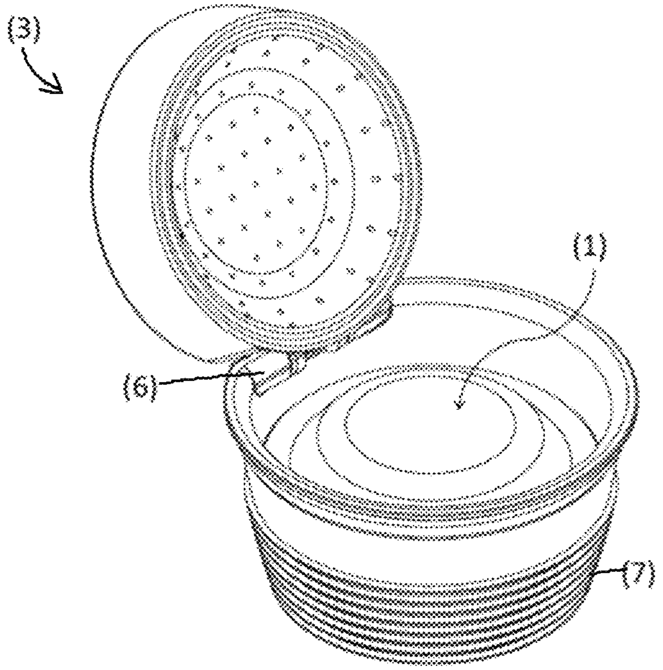
FIG. 20 shows the portion holder (3) at an open position with the single portion (1) inside the container part (31) thereof.
Figure 21:
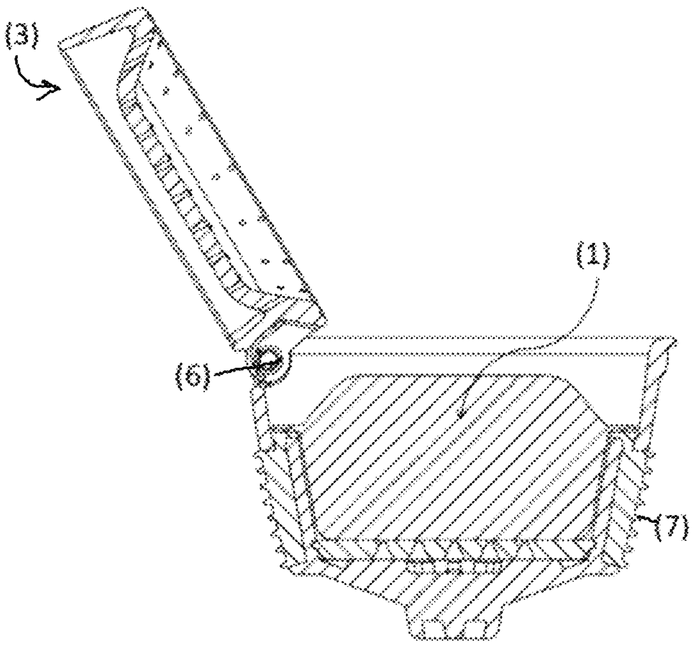
FIGS. 21 and 22 show different side-cut views of the portion holder (3) with single portion (1) inside thereof, both in open and closed positions.
Figure 22:
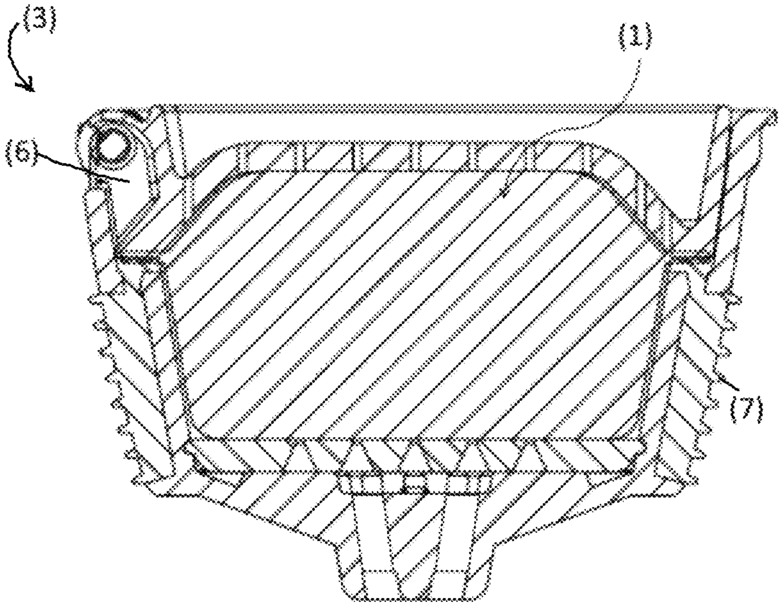

According to a notorious feature, the single portion (1) presents volumetric shape and dimension that are similar to the volumetric shape and dimension of the collection space provided by container and lid parts (31, 32).

This feature advantageously provides a maximum use of the volume available inside the portion holder (3), notably for the edible substance containing single portion (1).

The single portion (1) can present a rim wall portion arranged at a relative level such that the single portion (1) can sit therewith on a support step of the container part (31) that is provided as container sealing portion (34), whereby said container sealing portion (34) is preferentially provided on a elastically deformable material, whereby the most but not all of the beverage precursor substance is provided in the downstream portion thereof.

The single portion (1) can confine an edible substance collection space presenting volumetric shape and volumetric dimension that are similar to the volumetric shape and dimension of the collection space provided by container and lid parts (31, 32), whereby there is provided a beverage flow dispensing means (36) on the bottom region of the container part (31), such that the exterior surface of said single portion (1) is in direct contact with the flow conducting wall (321) of the lid part (32) on the upstream side, and with said beverage flow dispensing means (36) siting on the base wall (312) of the container part (31) on the downstream side, upstream of and in flow communication with a beverage discharge outlet arranged on said base wall (312).

The single portion (1) can confine an edible substance collection space presenting similar volumetric shape and similar volumetric dimension to the volumetric shape and dimension of the collection space provided by container and lid parts (31, 32) such that the top region thereof is in contact with the convex-like interior surface of the flow conducting wall (321) of the lid part (32), and whereby part of the volume of the single portion (1) occupied by the edible substance extends within the volume confined by the lid part (32) upstream of container sealing portion (35).

In this embodiment, a bigger volume fraction of single portion (1) extends downstream and a smaller volume fraction extends upstream of the interface region between container and lid parts (31, 32), and such that the exterior surface thereof is in the vicinity or in contact with the interior surface provided by said container and lid parts (31, 32), optionally also with a flow-dispensing part (36) provided on the base wall (312).

The single portion (1) can be configured such that, inside the closed portion holder (3) and in a non-flow condition, can be pressed downwards by the convex-like interior surface of the flow conducting wall (321).

Figure 23:
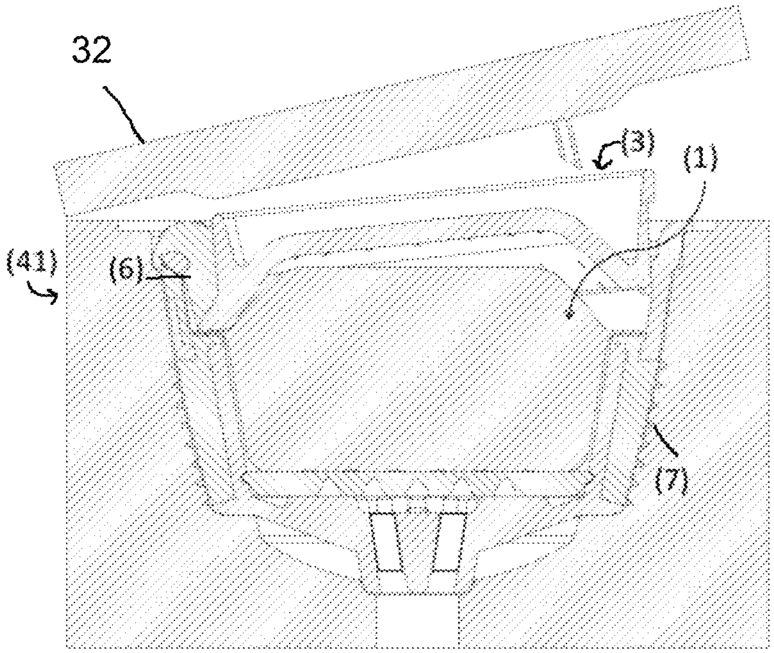
Figure 24:
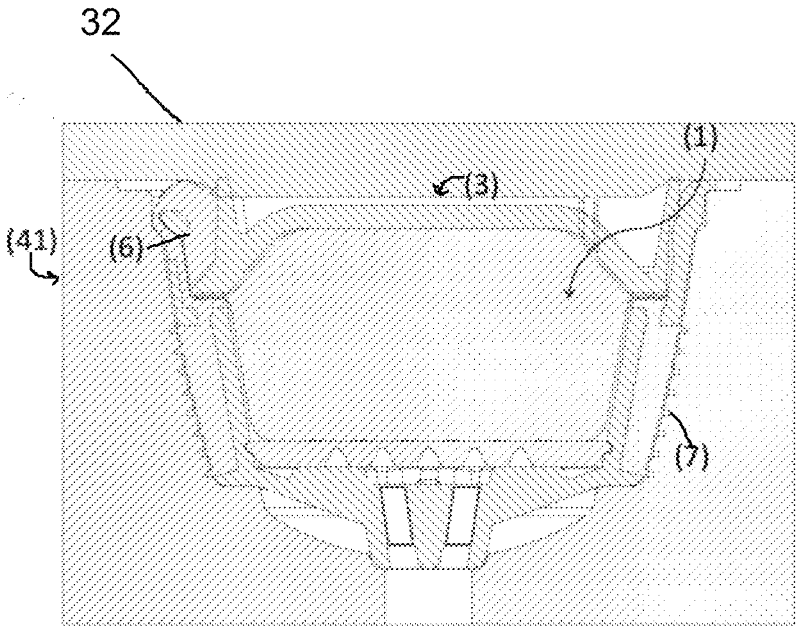
Figure 25:
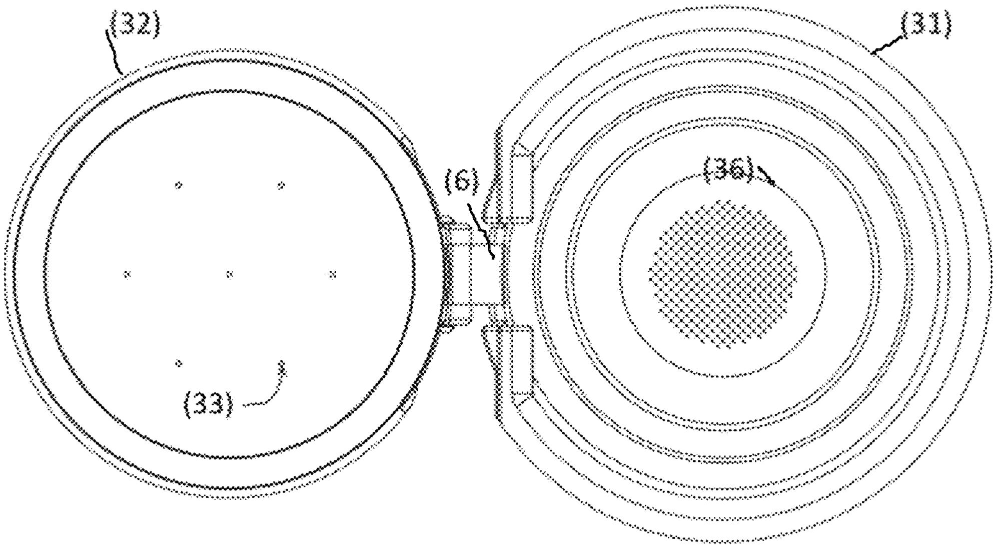
Figure 26:
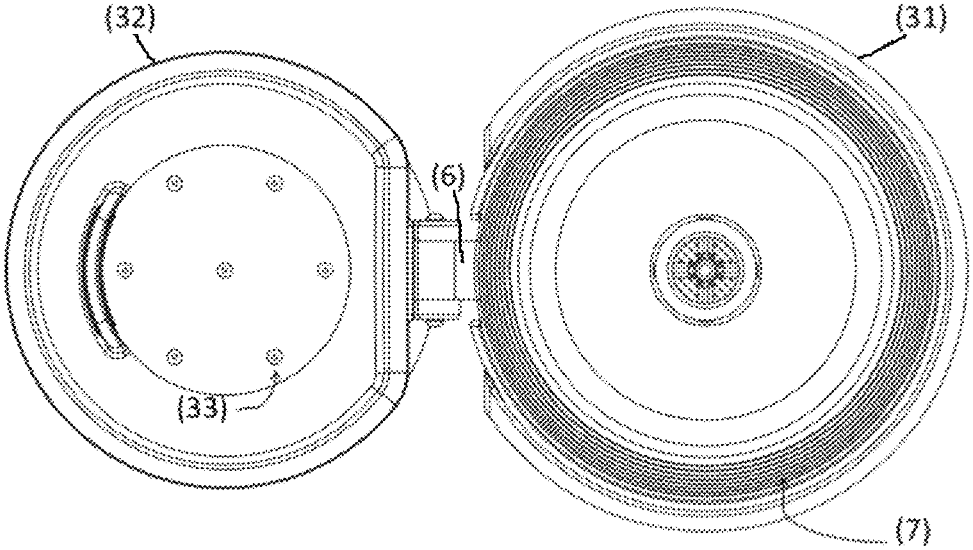
Figure 27:
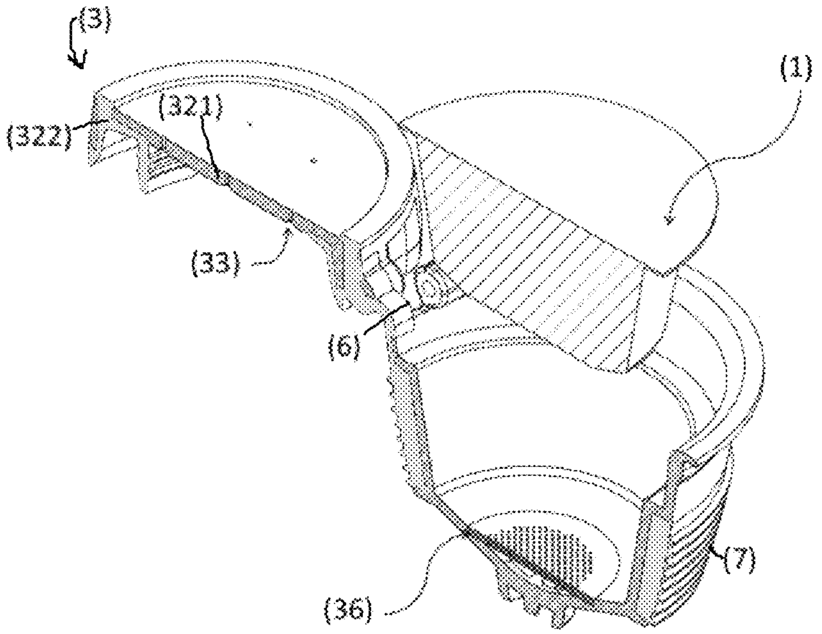
Figure 28:
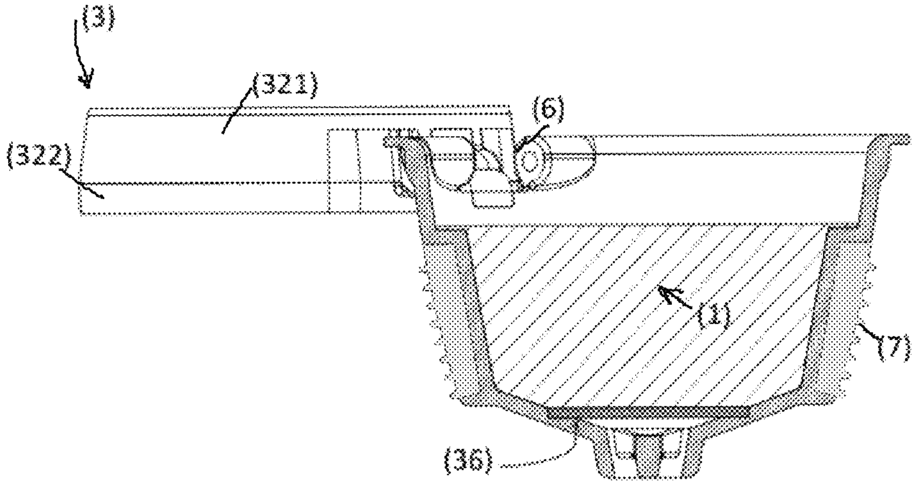

FIGS. 23 and 24 represent two particular moments of a process of beverage preparation according to the present invention.

FIGS. 25 to 28 represent a second embodiment of portion holder (3) whereby the flow conducting wall (321) presents a flat configuration that is non-recessed relative to the top wall of a single portion (1).

The single portion (1) in this case presents a lid part and a container part, whereby the lid part comprises a planar disk-like top wall that can be coupled coplanar with a rim region such that all edible substance can be confined below said top wall and respective rim region.

In this case the flow dispensing means (36) are provided as a circular plate, preferentially in a metallic or synthetic material, presenting a plurality of neighbouring flow discharge openings and adapted so that it can be retained, for example by means of pressured fitting, on an interior-oriented portion of the base wall of portion holder (3), in flow communication with flow outlets thereof.

The invention claimed is:

1. A process for operating a beverage preparation system comprising the steps:

providing a beverage preparation system, comprising a portion holder and a beverage preparation apparatus, the portion holder for receiving a single portion comprising a given quantity of beverage precursor substance inside a compostable and permeable confinement, said portion holder comprising:

a container part with a sidewall and a base wall, and a lid part with a flow-conducting wall presenting flow passageways, jointly confining a collection space extending upstream and downstream of a peripheral interface region between the container part and the lid part, said lid part being peripherally hinged to the container part by lid connection means so that the lid operates to a closed position at which the single portion is confined inside a cavity space, said container part being adapted so that the container part is retained inside a portion receiving part of an extraction device that is manually held and operated in a draw-like manner into an operating position engaged with a flow provision part of said extraction device, and wherein the portion holder presents retention means with different configuration and material properties from the sidewall of the container part, adapted so that the container part is retained in a pressurized fitting inside said portion receiving part;

the beverage preparation apparatus comprising the extraction device, the pressurized flow means upstream of the extraction device so that a pressurized fluid flows in a prevailing direction through said extraction device, portion holder and a single portion inside thereof, and a beverage preparation device comprising a portion receiving part that is manually removed from engagement with a flow-feeding part, manually removing the portion receiving part from engagement with the flow-feeding part;

manually inserting the portion holder into the portion receiving part such that the container part is retained inside the portion receiving part by means of pressurized fitting of retention means, and including a plurality of beverage preparation cycles, whereby each beverage preparation cycle includes the steps:

dropping the single portion into the container part, manually inserting the portion receiving part into engagement with the flow-feeding part;

initiating circulation of pressurized fluid flow into said beverage preparation device so as to obtain a beverage, whereby the plurality of beverage preparation cycles does not include removing the portion holder from the portion receiving part, removing the single portion out of the container part after opening the lid part, whereby said removal is obtained by turning the portion receiving part downwards such that the single portion falls out of the container part driven by gravity force, while the portion holder is further retained inside the portion receiving part.

2. The process according to claim 1, wherein the portion holder container part supports the retention means provided in a tubular shape around at least part of the sidewall such that the retention means presses under peripheral strain inside said portion receiving part, whereby the retention means present at least one projection extending outward in respect of at least most of the remaining sidewall of the container part that sits inside of the portion receiving part.

3. The process according to claim 1, wherein the retention means are provided in a different material or in a different material composition than the rest of said container part, and wherein at least one of the retention means and the container part of the portion holder are provided in a different material or in a different material composition as the portion receiving part.

4. The process according to claim 1, wherein the retention means present a non-smooth, grooved, exterior surface presenting at least one of: a rugosity and a pattern, with projections extending outwards in at least one of: a transversal and parallel direction in respect of the prevailing flow direction, configured so as to generate a material pressure with the corresponding interior surface of said portion receiving part transversal to said prevailing flow direction, whereby the retention means are provided in a material at least partially elastically deformable.

5. The process according to claim 1, wherein the retention means are provided as a plurality of outwards extending projections arranged successively, for example in rows, at least from the vicinity of the peripheral interface region between the container part and the lid part to the base wall, and wherein the retention means are provided as outwards extending projections presenting a cross-section profile narrowing from the base towards a free-edge thereof.

6. The process according to claim 1, wherein the container part presents the sidewall with an upstream sidewall portion and a downstream sidewall portion that is recessed inwards relative to the upstream sidewall portion, and also relative to an outward extending portion of the base wall, and wherein the retention means are provided on a laterally-oriented indent associated with said downstream sidewall portion, such that the retention means extend inwards and outwards in respect of the upstream sidewall portion.

7. The process according to claim 1, wherein the retention means are provided as an injection moulded part that extends through a perimeter transition region between upstream and downstream sidewall portions thereby forming at least one of:

a container sealing portion extending inwards along the interior perimeter and that provides sitting support, in the peripheral interface region between the container and lid parts, for a rim portion of the single portion and to a lid sealing portion, and a material connection of lid connection means that provide the hinged connection of the lid part with the container part at a peripheral region thereof.

8. The process according to claim 1, wherein said portion holder comprises:

on the container part a sidewall presenting an upstream sidewall portion and a downstream sidewall portion that supports retention means adapted for pressurized fitted retention of said container part inside the portion receiving part;

on the lid part a collar-like flow-confining wall extending laterally peripherally of a flow-conducting wall extending transversally to the prevailing flow direction, whereby the lid part is peripherally hinged connected to the container part by the lid connection means wherein the lid connection means include a material connection of the container part with the lid part, whereby said lid connection means are configured such that the lid connection means are provided by injection moulding of the container and lid parts such that the container and lid parts are produced as a single piece.

9. The process according to claim 1, wherein the lid connection means include a material connection provided in the form of an elastically bendable element, in a band shape or similar, that extends continuously from the upstream region of the upstream sidewall of the container part to the lid part, whereby the material connection includes an elastic material band that is provided such that the elastic material band exerts an elastic force on the lid part upwards in respect of the container part, such that the lid part tends towards the open position.

10. The process according to claim 1, wherein the lid connection means include a connection retention arrangement adapted so that the connection retention arrangement assists the retention of the lid part at the closed position on the container part, whereby said connection retention arrangement includes a male-female arrangement in opposing edges of, and arranged sideways in respect of, the material connection and adapted so as to provide a first hard-point retention of the lid part on the container part, whereby said male-female arrangement is provided on respective peripheral support non-curved portions of the container part and the lid part and corresponding to a portion of, and to a projection on, the upstream free-edge region, respectively.

11. The process according to 1, wherein the lid connection means and the holder retention means are provided in a material with similar elastic properties that extends continuously from the retention means to the lid connection means, whereby the lid connection means and the holder retention means are provided in a single part, or piece, as the container part and the lid part by means of bi-material injection moulding.

12. The process according to claim 1, further comprising the steps of:

manually opening the lid part previously to inserting a single portion into the container part;

manually closing the lid part previously to inserting the portion receiving part into the flow-feeding part, whereby the closure of the lid part is made by manually pressing a portion thereof onto retention on the container part.

13. The process according to claim 1 comprising the steps of:

removing the portion receiving part from a flow-feeding part after conclusion of a pressurized flow injection;

opening the lid part;

whereby opening of the lid part is enabled by manually pressing the lid part out of retention on the container part.

* * * * *